United States Patent [19]

Gill et al.

[11] Patent Number: 4,843,506
[45] Date of Patent: Jun. 27, 1989

[54] SHIELDS OF MAGNETORESISTIVE TRANSDUCERS

[75] Inventors: Hardayal S. Gill, Los Altos, Calif.; Ralph F. Simmons, Jr., Boise, Id.

[73] Assignee: Hewlett-Packard Company, Palo Alto, Calif.

[21] Appl. No.: 214,801

[22] Filed: Jun. 30, 1988

Related U.S. Application Data

[63] Continuation of Ser. No. 913,164, Sep. 29, 1986, abandoned.

[51] Int. Cl.⁴ .............................................. G11B 5/39
[52] U.S. Cl. .................................................. 360/113
[58] Field of Search ............................... 360/113, 128

[56] References Cited

U.S. PATENT DOCUMENTS 3,975,772  8/1976  Lin ...................................... 360/113
4,179,720 12/1979  Miura ................................. 360/113
4,447,839  5/1984  Dessere et al. ..................... 360/113

OTHER PUBLICATIONS

Magnetics of Small Magnetoresistive Sensors by Ching Tsang, J. Appl. Phys. 55(6), Mar. 15, 1984, pp. 2226-2231.

Primary Examiner—Robert S. Tupper
Attorney, Agent, or Firm—William H. F. Howard; Edward Y. Wong

[57] ABSTRACT

An improved shield for field sensing transducers used in magnetic storage devices is presented. The inventive shield provides a planar surface for the transducer to rest on, a single magnetic domain in the vicinity of the transducer, low magnetic reluctance for fields from the recording media, and stability against external magnetic fields, that is, high reluctance for external magnetic fields.

10 Claims, 5 Drawing Sheets

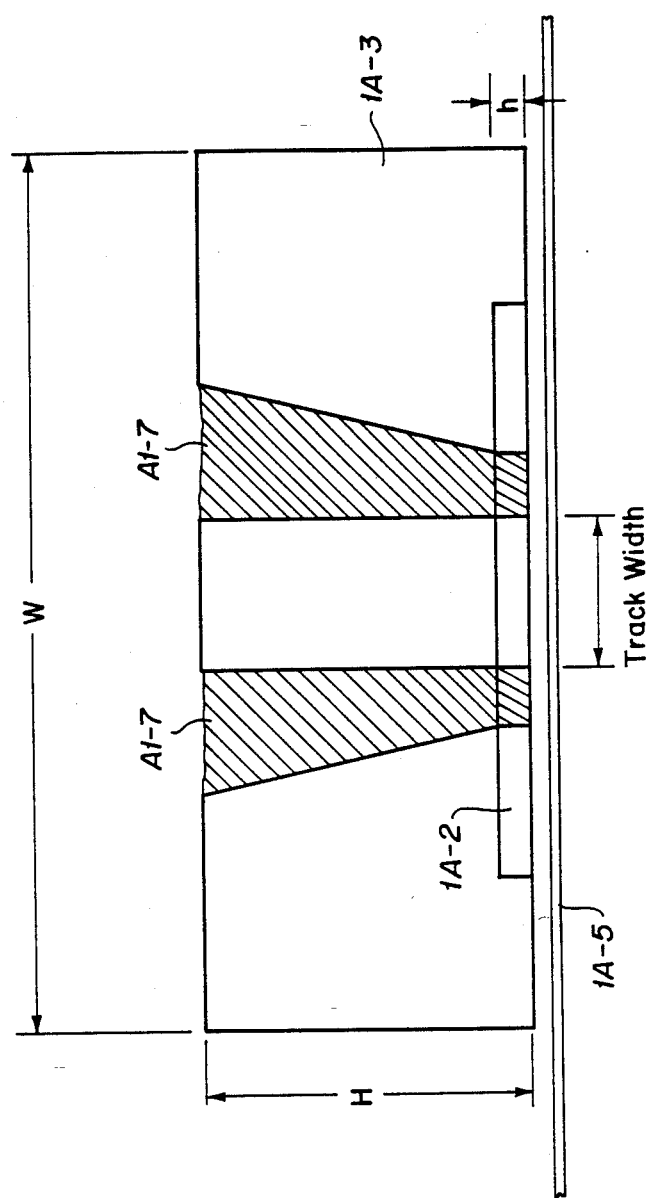

TRACK WIDTH

TRACK WIDTH

4,843,506

SHIELDS OF MAGNETORESISTIVE TRANSDUCERS

CROSS REFERENCE TO RELATED APPLICATION

This application is a continuation, of application Ser. No. 913,164, filed Sept. 29, 1986, now abandoned.

FIELD OF THE INVENTION

This invention relates to read/write heads for computer magnetic media. In particular, the invention relates to shields for magnetoresistive transducers.

BACKGROUND OF THE INVENTION

Field sensitive transducers, such as magnetoresistive transducers have several properties that make them desirable read heads for magnetic recording systems. Since their output voltage signal is proportional to the input current signal, magnetoresistive transducers can produce large magnitude output signals. When shielded from unwanted magnetic signals, these transducers can read high density recordings. Unlike inductive read heads, which detect changes in magnetic flux; magnetoresistive transducers detect magnetic flux. This feature makes them desirable in low velocity recording systems.

However, magnetoresistive transducers have three problems. First, small magnetoresistive transducers, desirable for high density data applications, often exhibit Barkhausen noise. Barkhausen noise originates from changes in the transducer's magnetic domain structure. Schemes to suppress magnetic domain activity in these transducers is outlined in the prior art. The article *Magnetics of Small Magnetoresistive Sensors* written by Ching Tsang and published in *The Journal Of Applied Physics* of Mar. 15, 1984 describes schemes to suppress domain activity and which is incorporated by reference herein. Secondly, magnetoresistive transducers exhibit the nonlinear characteristic shown in FIG. 5. FIG. 5 plots the output voltage of magnetoresistive head versus the magnetic field applied to the magnetoresistive head. The Tsang article incorporated above lists several biasing schemes that force magnetoresistive heads to operate in its linear range.

In order to take advantage of magnetoresistive head's ability to read high density data, the head needs insulation from magnetic fields emitted by surrounding devices. Shields located on either side of the head, as shown in FIGS. 1A and 1B accomplish this. However, these shields have four major problems. First, the shields may obtain an undesirable magnetic domain structure that exposes the magnetoresistive transducer to several magnetic domains as shown in FIGS. 3A and 3B. The boundaries of the magnetic domains produce abrupt changes in magnetic fields that distorts the transducer's output. Secondly, the shields may amplify and focus the stray magnetic fields emitted by surrounding devices commonly found in disc drives such as motors. The amplified and focused stray magnetic field may affect the magnetoresistive transducer's operation, change the transducer's biasing so that it operates in the non-linear range shown in FIG. 5, or erase the information stored on magnetic storage unit. Thirdly, shields with high magnetic reluctance or poor high frequency response may limit the speed at which the magnetoresistive transducer can read data.

SUMMARY OF THE INVENTION

The shield in accordance with the present invention obviates these problems. The present invention is a shield for a field sensing transducer such as a magnetoresistive transducer. The shield according to the present invention provides a planar surface for the magnetoresistive transducer to rest on; a stable, single magnetic domain in the vicinity of the field sensing transducer; high permeability for fields applied by the recording media; and insensitivity to externally applied fields.

The shield according to the present invention provides a planar surface for the field sensitive transducer to rest on. This reduces the transducer's exposure to mechanical stress and eliminates the problems associated with thin film step coverage. Since mechanical stresses affect the transducer's properties, the planar surface has the advantage of stabilizing the transducer.

In order to produce a shield with a stable, single magnetic domain in the vicinity of the field sensitive transducer, the shield is cut from anisotropic material with the easy axis of the material lying parallel with the long dimension of the shield. Additionally, the field sensing transducer 1A-2 is placed parallel to the shield's 1A-3 long dimension as shown in FIG. 1A. To further insure the existence of one magnetic domain in the vicinity of the field sensitive transducer, the height of the shield has a minimum and maximum range. A shield with a stable, single magnetic domain in the vicinity of the field sensitive element has the advantage of protecting the field sensitive transducer from magnetic domain transitions that produce unpredictable and nonreproducible output.

A high permeability shield is produced by making the shield from high permeability material and by choosing the shield's height so that it is several times the length of the flux decay in the magnetoresistive read head. If the shield has low permeability, then the flux from an approaching transition in the media is not effectively shielded from the transducer, i.e. the ability to resolve closely spaced transitions is degraded. However, if the shield has substantial reluctance or is too small, the magnetic flux is sensed when the transition is far from the sensor. A shield with a low reluctance has the advantage of shielding the flux from an approaching transition until the transition is directly under the field sensitive transducer.

The shield's insensitivity to externally applied fields provides stabilization against external fields by remaining unaffected by external fields. The shield achieves stability in the presence of external fields by maximizing the shape and material anisotropy. Large shape anisotropy is achieved by forming a shield with a small thickness to height ratio. Low material anisotropy is achieved by using a material with a small anisotropic field. A stable shield has the advantage of attenuating external magnetic fields that would otherwise cause the field sensitive transducer and magnetic media to produce erroneous data.

Thus, the shield of the present invention that provides a planar surface for the field sensitive transducer; exposes the field sensitive transducer to a single, stable magnetic domain; has high permeability; and is stable against external magnetic fields has numerous advantages. The advantages result in the field sensitive transducer having a greater signal to noise ratio. The improved signal to noise ratio enables the transducer to store a higher density of data on the magnetic media. The higher density lowers data storage cost.

BRIEF DESCRIPTION OF THE DRAWINGS

FIGS. 1A and 1B show two views of the shield of the present invention with the field sensitive transducer.

DETAILED DESCRIPTION OF THE PREFERRED EMBODIMENT

Figure 1B:
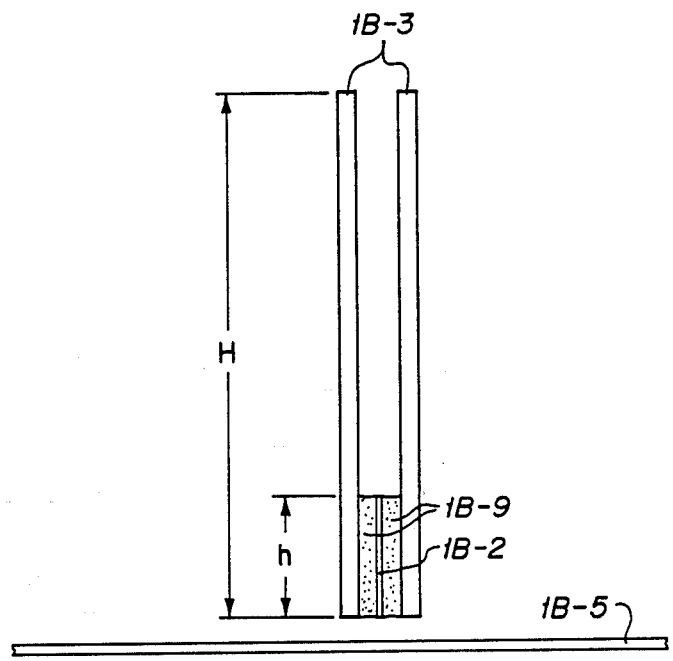

The elements in the drawings have a two part number. The first part of the number identifies the drawing and the second part of the number identifies the element on the drawing.

FIG. 1A shows the field sensitive transducer 1A-2 attached to the shield 1A-3. The wires 1A-7 conduct power to and the output signal from the transducer 1A-2. The wire 1A-7 defines the active region of the transducer 1A-2. This active region is equal to a track width of the storage media 1A-5. The transducer 1A-2 is located on the air bearing surface adjacent to the storage medium 1A-5. FIG. 1B shows a side view of the shield-transducer combination. The transducer 1B-2 is located between the shields 1B-3. The spaces between the transducer 1B-2 and shields 1B-3 are filled with insulator material 1B-9. The transducer 1B-2 used in the preferred embodiment of the invention is a field sensitive transducer 1B-2 such as a magnetoresistive transducer.

The shield 1B-3 provides a planar surface for the transducer 1B-5 to rest upon. One entire side of the transducer 1B-2 must rest on the layer of the insulation 1B-9 of shield 1B-3.

Figure 3A:
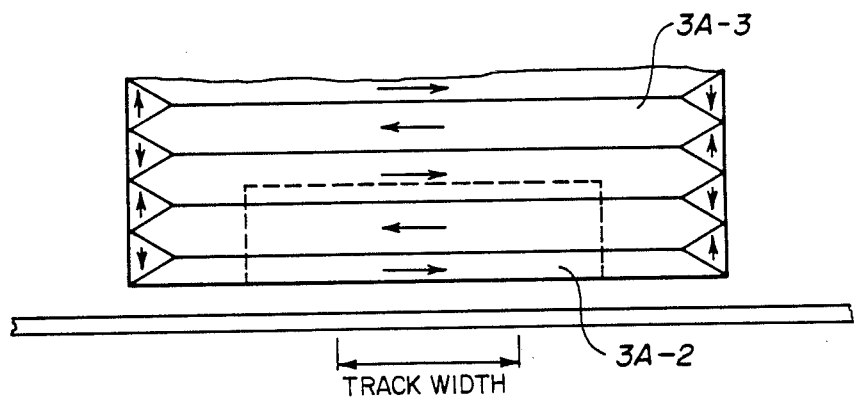
FIGS. 3A and 3B show magnetic domains in prior-art shields.
Figure 3B:
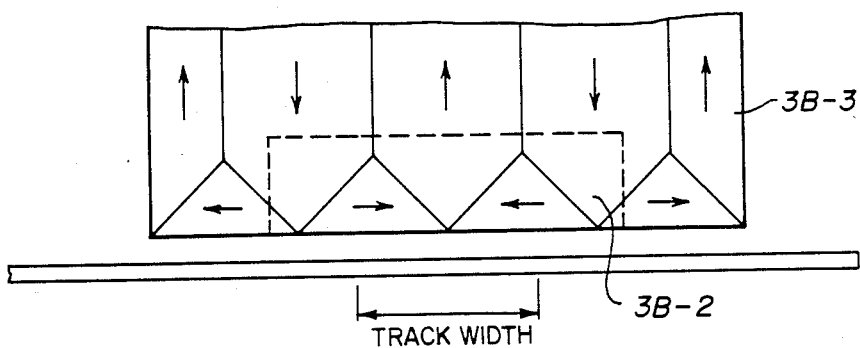
Figure 4A:
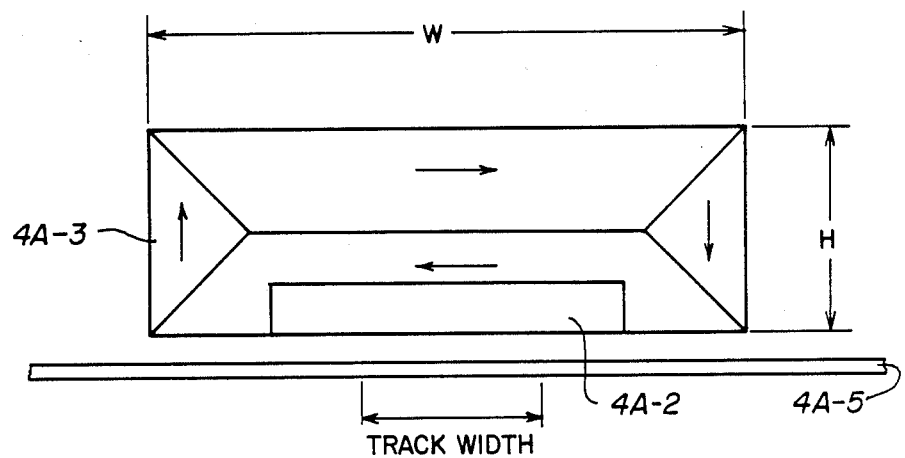
FIGS. 4A and 4B show magnetic domain configurations for shields according to the present invention.

Prior-art shields 3A-3 and 3B-3 have the magnetic domain configuration shown in FIGS. 3A and 3B. The transducer 3A-2, 3B-2 is exposed to several magnetic domains which causes the transducer 3A-2, 3B-2 to have unpredictable and nonreproducible output. Shield 4A-3 and 4B-3 of the present invention exposes the transducer 4A-2, 4B-2 to one magnetic domain. If the shield 4A-3 is made from material exhibiting uniaxial anisotropy, due to magnetocrystalline, and/or magnetostriction effects, the material must be cut so that its long axis is parallel to the magnetic easy axis of the material. The magnetic easy axis is the axis which the magnetic field prefers to lie. Also, this easy axis must be parallel to the track width of the storage medium 4A-5 and parallel to the long axis of the transducer 4A-2 as shown in FIG. 4A. The height of the shield 4A-3 must be more than 4 times height of the transducer 4A-2.

Figure 2:
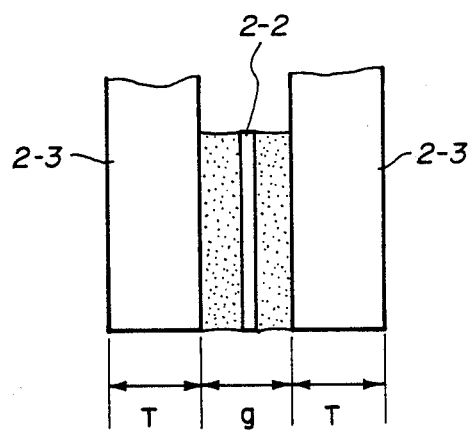
FIG. 2 shows an expanded view of FIG. 1B.

In order to produce a shield with low magnetic reluctance, the height H of the shields 4B-3 must be significantly greater than the characteristic length of flux decay in the transducer 4B-2. If the height of the shield 4B-3 is greater than 10 times the characteristic length of flux decay in the transducer 4B-2, then the shield 4B-3 is essentially infinite in size, has low magnetic reluctance and hence does not limit the readback efficiency of the sensor element 4B-2. The length of flux decay in the transducer 4B-2 is $$l = \sqrt{\frac{\mu g t}{2}}$$

where $\mu$ is permeability of the sensor; g is the gap length shown in FIG. 2, and where t is the thickness of the transducer. In the preferred embodiment of the invention, for example, $\mu = 1000$; $g = 1$um; and $t = 0.05$ um and flux decay length equals 5 um. Thus, the height of the shield 4B-3 should be significantly greater, for example, 100 um.

Figure 4B:
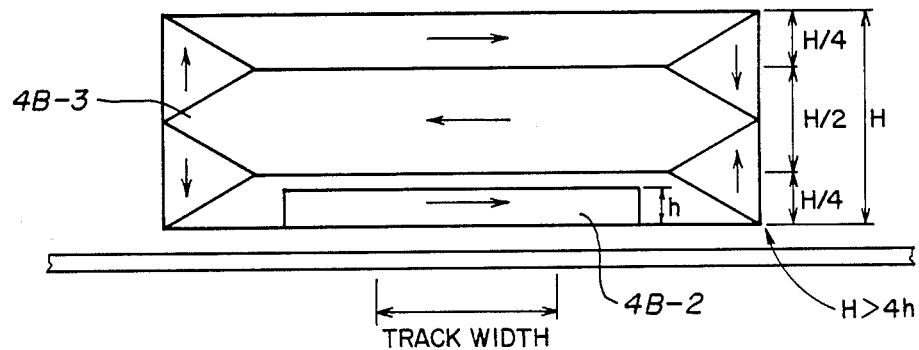
Figure 5:
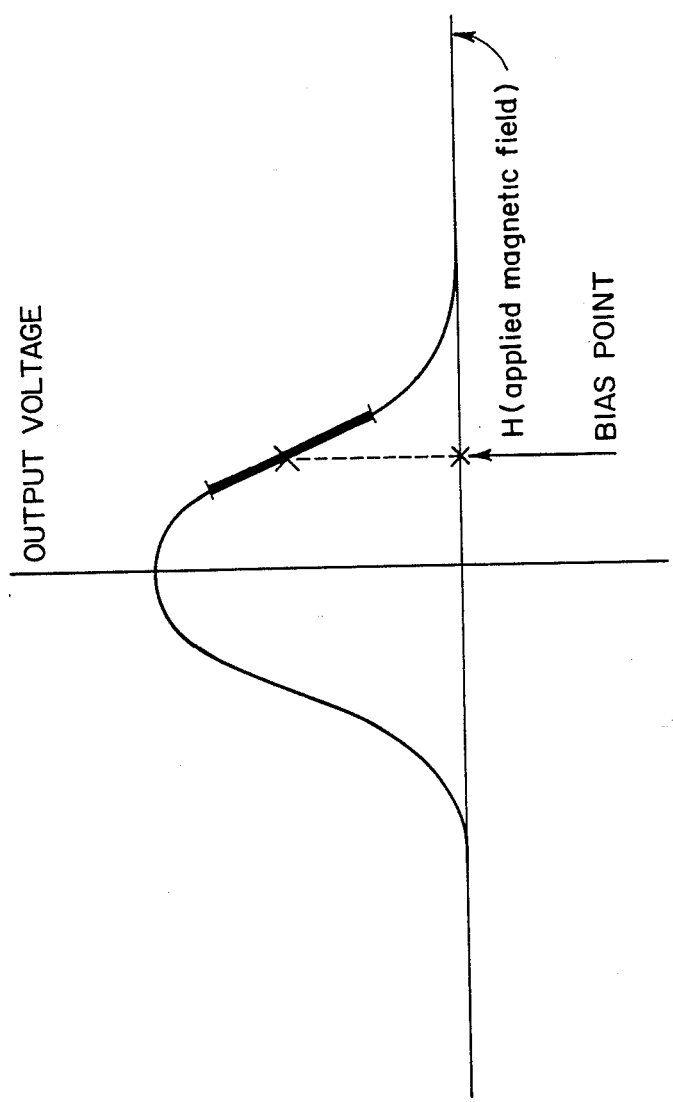
FIG. 5 shows the operation range of magnetoresistive heads.

The shield 4B-3, according to the present invention, resists being magnetized by external fields. If a field 20 times greater than the earth's field, such as $H = 10$ Oersteds, is applied in a direction normal to the plane of the recording media the shield's 4B-3 resulting magnetization level must be less than 10% of the shield's saturation magnetization level. Using a Stoner-Wolfarth equation, the shield's 4B-3 magnetization level is $$\frac{M_y}{M_s} = \sin \theta = \frac{H_A}{H_K + \frac{4\pi M_S T}{T + H}}$$

where $H_A$ is the external magnetic field, $H_K$ is the anisotropic field of the shield material, and $$\frac{4\pi M_S T}{T + H}$$

is the anisotropic field due to the shape of shield 4B-3 where $M_S$ = the saturation magnetization of the shield material, T is the thickness of the shield as shown in FIG. 2, and H is the height of the shield as shown in FIG. 4B.

In a shield according to the present invention, the shield material is $Ni_{81}Fe_{19}$ where the anisotropic field of shield material is $H_K = 5$ Oe, and $4\pi M_s = 10^4$ G. For the magnetization at the center of the shield 4B-3 to be less than 10% of the shield's saturation magnetization, the value of the Stoner-Wolfarth equation should be less and 0.1. For this to occur, the lower limit of the ratio T/H is approximately 0.01. For a shield thickness of 2 um, the shield height must be less than 200 um.

The shield's ability to resist magnetization can be furhter augmented by making the shields 4B-3 from materials that provide higher $H_K$ and $4\pi M_S$ values. For $Co_xM_yN_z$ material systems (where M=Zr, Hf, Ti, Y; N=Nb, Mo, W; X=85 to 92% and y+z=8 to 15%), $H_K = 30$ to 50 oe and $4\pi M_S$ 10 KG to 15 KG can be obtained. The concentrations of M and N elements are selected to obtain zero magnetostrictive material, that is, material insensitive to external stress. By using $H_K = 30$ Oe and $4\pi M_S = 15$ KG in the Stoner-Wolfarth equation, we obtain 0.004 for the T/H minimum value. This implies that for T=2 um, H must be less than 400 um rather than 200 um for the nickel/iron shield. Also, for shields of a given height thinner shields can be used. Thinner shields are advantageous from device performance and fabrication standpoints.

We claim:
1. An apparatus comprising:
    a magnetoresistive field sensing transducer having a long axis and a height; and
    a shielding means located adjacent to said field sensing transducer for exposing said transducer to one stable magnetic domain of said shielding means, the shielding means comprising material exhibiting uniaxial anisotropy cut so that its long axis is parallel its magnetic easy, where the shielding means' magnetic easy axis is parallel with the long axis of the field sensing transducer and its height is four times the height of the field sensing transducer.

2. An apparatus in claim 1 wherein said shielding means forms a planar surface.

3. An apparatus as in claim 2 wherein the magnetic easy axis of said plane is parallel to the long dimension of said plane.

4. An apparatus as in claim 3 wherein the long dimension of said field sensing transducer is parallel to said long dimension of said plane.

5. An apparatus as in claim 4 wherein the height of said plane is more than four times the height of said field sensing transducer.

6. An apparatus as in claim 1 wherein said shielding means comprises a high permeability shield for said field sensing transducer.

7. An apparatus as in claim 6 wherein the height of said plane is greater than the characteristic length of flux decay in said field sensing transducer.

8. An apparatus as in claim 1 wherein said shielding means comprises a means for resisting magnetization by external fields.

9. An apparatus as in claim 8 wherein the means to resist magnetization by external fields further comprises increasing the anisotropic field due to the shape and to the material of the shield.

10. An apparatus as in claim 9 wherein said high permeability shield comprises a first and second plates are made out of $Co_xM_yN_z$ material system, wherein M=Zr, Hf, Ti, Y; N=Nb, Mo, W; X=85 to 92% and Y+Z=8 to 15%.

* * * * *